July 15, 1924.
O. H. TWETEN
1,501,632
CUE TENONING AND TRIMMING MACHINE
Original Filed March 25, 1919
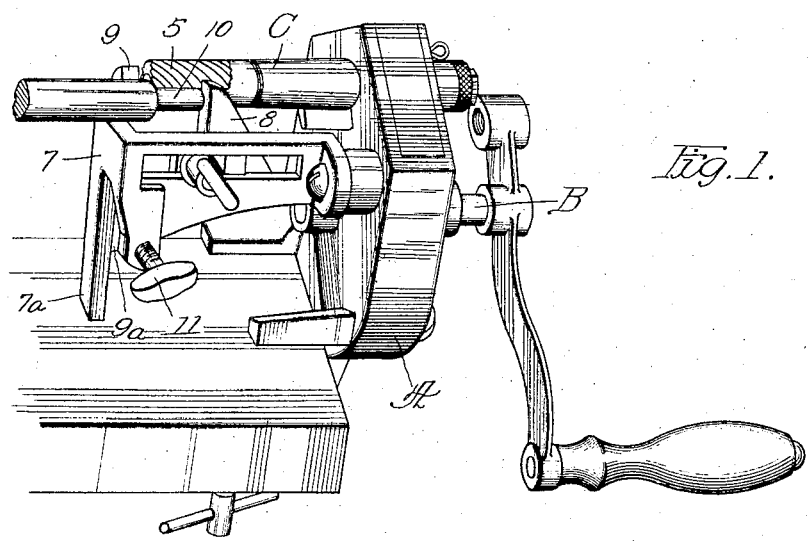
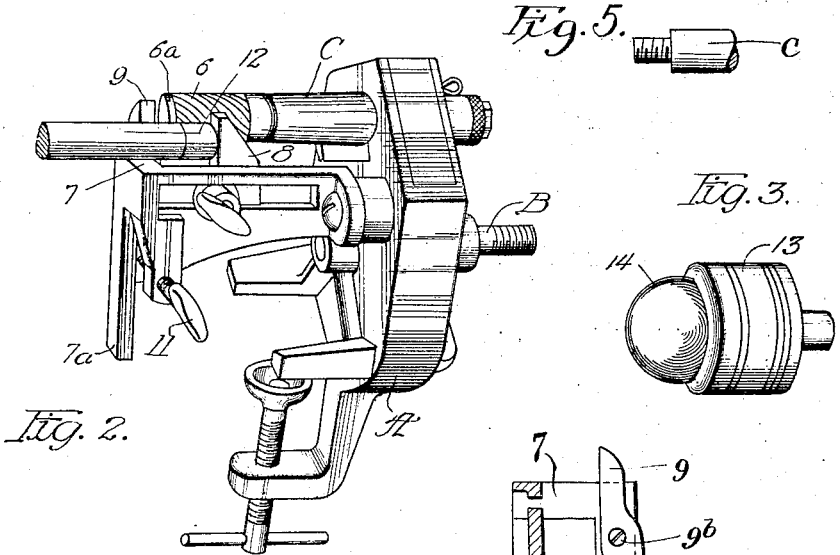
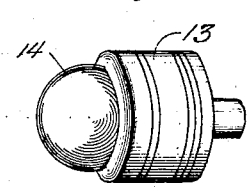
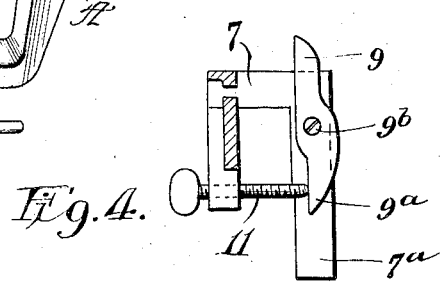
Inventor:
Oscar H Tweten.
by Jubel + Mueller
Attys Patented July 15, 1924.

1,501,632

UNITED STATES PATENT OFFICE.

OSCAR H. TWETEN, OF CHICAGO, ILLINOIS.

CUE TENONING AND TRIMMING MACHINE.

Application filed March 25, 1919, Serial No. 285,018. Renewed April 12, 1920. Serial No. 373,386.

*To all whom it may concern:*

Be it known that I, OSCAR H. TWETEN, a citizen of the United States, residing at Chicago, in the county of Cook and State of Illinois, have invented a certain new and useful Improvement in Cue Tenoning and Trimming Machines, of which the following is a full, clear, concise, and exact description, reference being had to the accompanying drawings, forming a part of this specification.

My invention relates to cue tenoning and trimming machines, an object being to provide a simple, cheap and effective device of this character adapted for cutting tenons on the ends of cues and trimming the point or ferrule placed thereon so as to be flush with the peripheral face of the end of the cue. Devices of this character must be simple, cheap and effective as they are sold in places where the use of any single machine is not very extensive and generally by unskilled labor.

In the accompanying drawing I have illustrated the preferred form of my invention in which—

Fig. 1 is a perspective view of the device arranged for cutting the tenon on the cue end;

Fig. 2 is a similar view but with a trimming cutter mounted on the main shaft or spindle for trimming the peripheral face of the point or ferrule so as to make it flush with the cue end; and Fig. 3 is a ball polishing device adapted to be carried by the end of the main shaft or spindle in place of the cutting elements.

Fig. 4 is a sectional view taken just to the right of the stop 9 shown in Figs. 1 and 2, and looking toward the stop. Fig. 5 is a detail view showing the threaded extension of the spindle C.

Referring now more in detail to my invention as illustrated it comprises a main frame or a gear case A carrying suitable speed-up gearing connecting the crank shaft B with the main spindle C. This spindle C carries a threaded end as shown in Fig. 5 to receive a threaded tenon cutter 5 or trimming cutter 6, these cutters being readily interchangeable. In order to limit the operation of the device so as to cut a predetermined sized tenon upon the cue, I provide a bracket 7 carrying an adjustable end stop 8 and a side stop 9, the latter being adapted to determine the diameter of the tenon 10 which is to be cut on the end of the cue. This side stop 9 is adjustably controlled by the thumb screw 11 which acts upon the lower end 9ª of the stop 9, the stop being pivoted at a central point on a screw 9ᵇ carried by brackets 7 so that when the screw 11 is threaded in and out, the upper end of the stop 9 is moved relative to the cutter 5. This bracket 7 which carries the stops has a depending leg 7ª which rests upon the table or bench to which the device is attached so as to steady it.

In the operation of the device, the tenon cutter 5 is first placed upon the end of the spindle C and the end stop 8 adjusted according to the length of tenon 10 which is to be cut. The side stop 9 is then adjusted so that the operator may rest the cue upon the top of the bracket 7 and in cutting engagement with the milling cutter 5. The cue is then rotated by hand usually, but of course by power machinery if desired, and pressed against the cutter 5. The rotation of the cue cuts the round tenon on the end thereof and the thumb screw 11 may then be adjusted slowly and the cue rotated against the cutter 5 until the proper diameter of the tenon 10 is secured.

If desired, the side stop 9 may be adjusted for the proper diameter of the tenon prior to starting the cutting operation in which case the operator simply rests the cue on the bracket and revolves it against the milling cutter 5 until it engages the stop 9 at which time the tenon 10 is of the proper dimension.

The operator now unscrews the milling cutter 5 and replaces it with the trimming cutter 6 and also places a ferrule or point 12 upon the end of the cue. These ferrules are usually of fibre and slightly larger than the cue end. In order to trim the ferrule down so as to flush with the peripheral face of the cue, the cue is rested upon the bracket 7 and revolved against the trimming cutter 6. Now in order to bring about a smooth and flush trimming of the ferrule 12 I provide the trimming cutter 6 with a blank tip 6ª of substantially the same diameter as the cutter 6. Thus as the cue is revolved against the cutter 6 the point 12 is trimmed down until the cue comes into contact with the blank end 6ª, at which time the cutting operation ceases. The end of the cue has now been trimmed so that the ferrule and cue body are flush and it is ready to receive the usual tip.

A further use for the device is in polishing billiard balls which may be accomplished by substituting a cupped wooden element 13 for the cutters and removing the bracket 7 at which time this polishing element 13 may be rotated at high speed by means of the hand crank so as to polish the billiard ball 14 which is held by hand against rotation in the cupped end of the element 13 as it is revolved.

It will thus be apparent that I have provided a simple machine of this character which is cheap and effective and may be used by the ordinary unskilled labor such as is usually employed in clubs, billiard rooms, etc.

Although I have shown my device as a hand operated machine it is to be understood that it may be either hand or power operated. Also I understand that changes and modifications of my invention will readily occur to those skilled in the art and therefore I do not desire to be limited to the exact structure shown and described but aim to cover all that which comes within the spirit and scope of the appended claims.

What I claim as new and desire to secure by Letters Patent is:

1. In a cue trimming machine, a cutter shaft, a cue rest adjacent the shaft on which the cue may be rotated, and a blank tipped milling cutter for trimming the cue end, said cutter carrying a blank tip for engaging the side of the cue when rotated to limit the cutting action so as to have a flush finished cue end.

2. In a cue trimming machine, a rotatable side milling cutter, a cue support for holding the side of the ferrule end of a ferruled cue so as to be rotated against the milling cutter to mill the cue ferrule, and a stop carried with the cutter and flush with the cutting surface thereof for engagement with the side of the cue to limit the cutting action of the milling cutter so as to turn the ferrule flush with the cue automatically as the cue is rotated.

In witness whereof, I hereunto subscribe my name this 3rd day of March A. D., 1919.

OSCAR H. TWETEN.